(12) United States Patent
Grigore

(10) Patent No.: US 11,432,027 B2
(45) Date of Patent: *Aug. 30, 2022

(54) SYSTEMS AND METHODS FOR MEDIA CONTENT NAVIGATION AND FILTERING

(71) Applicant: Rovi Guides, Inc., San Jose, CA (US)

(72) Inventor: George Grigore, Iasi (RO)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,196

(22) Filed: Dec. 11, 2020

(65) Prior Publication Data

US 2021/0152867 A1    May 20, 2021

Related U.S. Application Data

(63) Continuation of application No. 16/366,387, filed on Mar. 27, 2019, now Pat. No. 10,897,642.

(51) Int. Cl.
*H04N 21/231* (2011.01)
*H04N 21/266* (2011.01)
(Continued)

(52) U.S. Cl.
CPC .  *H04N 21/26603* (2013.01); *H04N 21/23109* (2013.01); *H04N 21/278* (2013.01); *H04N 21/4828* (2013.01)

(58) Field of Classification Search
CPC .................. H04N 21/26603; H04N 21/23109
See application file for complete search history.

(56) References Cited

U.S. PATENT DOCUMENTS 8,484,679 B1    7/2013  Chtchedrina et al.
9,430,115 B1    8/2016  Yun
(Continued)

FOREIGN PATENT DOCUMENTS

EP    2525567 A2    11/2012

OTHER PUBLICATIONS

U.S. Appl. No. 16/366,387 (now U.S. Pat. No. 10,897,642), filed Mar. 27, 2019, George Grigore.
(Continued)

*Primary Examiner* — Michael H Hong
(74) *Attorney, Agent, or Firm* — Haley Guiliano LLP

(57) ABSTRACT

The system generates a display providing storyline information. The display includes, for example, a plurality of storyline identifiers, a plurality of time period indicators, and a plurality of episode indicators. Episode indicators indicate an episode having a segment of the storyline corresponding to a storyline identifier. The system may receive a user input selecting a storyline, or further filtering an existing storyline to tailor the displayed information more closely to a storyline of interest. The system updates the display to each reflect segments within episodes corresponding to the selected storyline identifier. The display may include a grid, with the storyline identifiers arranged along one axis and the time period indicators arranged along a different axis. The system may process metadata to determine storylines, and filter what information is displayed based on user input, the metadata, or both. Storylines include, for example, characters, locations, plots, teams, players, or other attributes.

19 Claims, 14 Drawing Sheets

(51) Int. Cl.
   *H04N 21/482*    (2011.01)
   *H04N 21/278*    (2011.01)

(56) References Cited

U.S. PATENT DOCUMENTS

| | | |
|---|---|---|
| 9,813,784 B1 | 11/2017 | Carlson et al. |
| 10,055,494 B1 * | 8/2018 | Bordenet .............. G06F 16/738 |
| 10,147,461 B1 | 12/2018 | Bates et al. |
| 2002/0036719 A1 | 3/2002 | Moir |
| 2007/0154163 A1 | 7/2007 | Cordray |
| 2008/0244683 A1 | 10/2008 | Matthews |
| 2013/0347037 A1 | 12/2013 | Soroushian |
| 2016/0105708 A1 | 4/2016 | Packard et al. |
| 2017/0034578 A1 | 2/2017 | Patel et al. |
| 2017/0142491 A1 | 5/2017 | Werth et al. |
| 2018/0004746 A1 | 1/2018 | Hedinsson et al. |
| 2018/0041820 A1 | 2/2018 | Xu et al. |
| 2018/0063580 A1 | 3/2018 | Wittke |
| 2019/0014367 A1 | 1/2019 | Thomas et al. |
| 2019/0058921 A1 | 2/2019 | Christie et al. |

OTHER PUBLICATIONS

U.S. Appl. No. 16/366,394 (now allowed), filed Mar. 27, 2019, George Grigore.

* cited by examiner

GAME OF THRONES

▷ Storyline: Character: Daenerys Targaryen

Daenerys Targaryen and her followers arrive to complete the trade of one of her dragons to the slaver Kraznys for the 8,000-strong Unsullied army.

PLAY ALL

| STORYLINE: | TIME: | 00:11:21-00:15:30 | 00:31:28-00:36:04 | 00:48:19-00:57:56 | 00:04:12-00:19:41 |
|---|---|---|---|---|---|
| Winterfell | | GAME OF THRONES S2 E4 | GAME OF THRONES S2 E5 | GAME OF THRONES S3 E3 | GAME OF THRONES S3 E3 |
| Daenerys Targeryen | | GAME OF THRONES S3 E4 | GAME OF THRONES S3 E4 | GAME OF THRONES S3 E4 | GAME OF THRONES S3 E4 |
| Jon Snow | | GAME OF THRONES S1 E6 | GAME OF THRONES S1 E6 | GAME OF THRONES S1 E8 | GAME OF THRONES S2 E1 |
| King's Landing | | GAME OF THRONES S1 E2 | GAME OF THRONES S1 E2 | GAME OF THRONES S1 E2 | GAME OF THRONES S1 E2 |

FIG. 1

| EPISODE 1 | 0 | Season 2 (2012) | | | | |
|---|---|---|---|---|---|---|
| Season 1 (2011) | "Winter is Coming" | Episode 1: 0 min | "The North Remembers" 1.1 On Dragonstone | | | |
| Season 2 (2012) | "The North Remembers" | Episode 1: 10 min | "The North Remembers" 1.2 In the Riverlands | | | |
| Season 3 (2013) | | Episode 1: 20 min | "The North Remembers" 1.3 At Winterfell | | | |
| Season 4 (2014) | | Episode 1: 30 min | "The North Remembers" 1.4 Beyond the Wall | | | |
| Season 5 (2015) | | Episode 1: 40 min | "The North Remembers" 1.5 In the Red Waste | | | |

| | Date/Time 1 | Date/Time 2 | Date/Time 3 | Date/Time 4 | Date/Time 5 | Date/Time 6 | Date/Time 7 |
|---|---|---|---|---|---|---|---|
| Character 1 | S1/E1 Plot 3 | | | S5/E2 Plot 1 | | S2/E1 Plot 2 | |
| Character 2 | | | | S5/E2 Plot 1 | | | S1/E2 Plot 2 |
| Character 3 | S4/E2 Plot 2 | | | | S3/E2 Plot 3 | | |
| Character 4 | | S1/E1 Plot3 | | | | | |

| | Date/Time 2 | Date/Time 3 | Date/Time 4 | Date/Time 6 | Date/Time 7 | Date/Time 8 | Date/Time 9 |
|---|---|---|---|---|---|---|---|
| Character 1 | S1/E1 Plot 3 | S5/E2 Plot 1 | S2/E1 Plot 2 | | S1/E2 Plot 2 | S1/E3 Plot 2 | S1/E2 Plot 2 |
| Character 2 | | S5/E2 Plot 1 | | | | | |

| | 0 | 15 min | 30 min | 45 min | 1:00 |
|---|---|---|---|---|---|
| Character 1 | S1/E1 Plot 3 | | | S2/E1 Plot 2 | |
| Character 2 | S5/E2 Plot 1 | | S5/E2 Plot 1 | | S1/E2 Plot 2 |
| Character 3 | S4/E2 Plot 2 | | | | |
| Character 4 | S1/E1 Plot3 | S3/E2 Plot 3 | | | |

| | Episode 1 | Episode 2 | Episode 3 | Episode 4 | Episode 5 | Episode 6 | Episode 7 |
|---|---|---|---|---|---|---|---|
| Season 1 | x | x | | x | x | x | x |
| Season 2 | x | x | x | | x | x | x |
| Season 3 | x | | x | | x | x | x |
| Season 4 | | x | x | x | x | x | x |
| Season 5 | x | x | x | x | x | x | x |

| | Episode 1 | Episode 2 | Episode 3 | Episode 4 | Episode 5 |
|---|---|---|---|---|---|
| Season 1 | x | x | x | x | x |
| Season 2/ Character 1 | | Location 1 | | Location 3 | x |
| Season 2/ Character 2 | x | Location 1 | Location 2 | | x |
| Season 2/ Character 3 | | x | Location 2 | Location 3 | x |
| Season 3 | x | x | x | x | x |
| Season 4 | | x | x | x | x |

| | Episode 2 | Episode 3 | Episode 4 |
|---|---|---|---|
| Season 1 | x | x | x |
| Season 2/ Character 1 | Location 1 | Location 3 | |
| Season 2/ Character 2 | Location 2 | Location 3 | Location 2 | Location 4 | Location 5 |
| Season 2/ Character 3 | Location 2 | Location 3 | | Location 4 | |
| Season 2/ Character 4 | | | Location 2 | | Location 5 | x |
| Season 3 | x | x | x |

| | Episode 3 | Episode 4 | Episode 5 | Episode 6 |
|---|---|---|---|---|
| Season 1 | x | x | x | x |
| Season 2/ Character 1 | Location 2 | | Location 5 | x |
| Season 2/ Character 3 | Location 2 | Location 4 | | x |
| Season 2/ Character 4 | | | Location 5 | x |
| Season 2/ Character 5 | | Location 1 | Location 3 | x |
| Season 3 | x | x | x | x |

| | Episode 3 | Episode 4 | Episode 5 | Episode 6 | Episode 7 | Episode 9 | Episode 10 |
|---|---|---|---|---|---|---|---|
| Season 1 | x | | x | | | | |
| Season 2/ Character 1 | Location 2 | Location 5 | x | x | x | x | x |
| Season 2/ Character 4 | Location 2 | Location 5 | | | x | x | x |
| Season 3 | x | | x | x | x | | |
| Season 4 | x | | x | x | x | | x |

FIG. 21

| | S2EP3 | S2EP3 | S3EP3 | S2EP5 | S2EP5 | S2EP5 | S2EP5 | S2EP5 |
|---|---|---|---|---|---|---|---|---|
| Character 1 | | x | | | | | | |
| Location 2 | x | | x | | | | | |
| Location 3 | | | | | | | | x |
| Location 5 | | | | | | | x | |
| Location 6 | | | | | | x | | |
| Location 8 | | | | | x | | | |

SYSTEMS AND METHODS FOR MEDIA CONTENT NAVIGATION AND FILTERING

CROSS-REFERENCE TO RELATED APPLICATION

This application is a continuation of U.S. patent application Ser. No. 16/366,387, filed on Mar. 27, 2019. The disclosure of which is hereby incorporated by reference herein in its entirety.

BACKGROUND

The present disclosure relates to devices displaying storyline indicators, and, more particularly, devices that provide indicators corresponding to a storyline.

SUMMARY

Media content, such as episodic programming, is becoming more and more complex. For example, a typical show might include a large number of seasons and episodes, which might be released over several years or even longer. Further, some programming includes complex plot lines, a large number of characters, and a large number of acts. Some series maintain multiple storylines that continue from one episode to another, or even from one season to the next. Accordingly, a viewer may find it hard or tedious to follow the storylines, or may find it difficult to navigate the series and binge watch a selection of episodes or sections from episodes. Each episode of a series usually includes a series of chapters, each corresponding to one or more storylines. Similarly, some sports events or other programming takes place in leagues and playoffs (e.g., with groups and eliminations), thus spanning more than one episode, game, or event.

The present disclosure describes systems and methods for indicating segments and episodes of a program corresponding to a storyline. Providing a visual indication of the storylines extending among seasons and episodes, presented in a simple and familiar format for the user, allows the user to consider the individual storylines. For example, displaying the relevant data for seasons and episode, with timelines, in a grid format enables users to navigate to the content they want to consume. A similar format may be used to organize and display data about sports events, so the user can filter and watch content in a convenient way.

Systems are described that generate a display of media content, arranged by episode, season, storyline, or other suitable partitioning. The display may be arranged in a grid. The system is configured to receive a selection from the user, specifying a storyline. In response to a storyline being selected, the system filters or otherwise updates the display to highlight content corresponding to the storyline.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows an illustrative display including storyline identifiers, episode identifiers, and time indicators, in accordance with some embodiments of the present disclosure;

FIG. 12 shows an illustrative display including a grid having sub-grids, in accordance with some embodiments of the present disclosure;

FIG. 14 shows an illustrative display including a grid showing episode identifiers for a program, in accordance with some embodiments of the present disclosure;

FIG. 15 shows an illustrative display including a grid showing episode identifiers for the program of FIG. 14, filtered by characters, in accordance with some embodiments of the present disclosure;

FIG. 16 shows an illustrative display including a grid showing episode identifiers for the program of FIG. 14, with a modified timeline, in accordance with some embodiments of the present disclosure;

FIG. 17 shows an illustrative display including a grid showing episode identifiers for a program, without filtering, in accordance with some embodiments of the present disclosure;

FIG. 18 shows an illustrative display generated by filtering information included in the display of FIG. 17 by character and location, in accordance with some embodiments of the present disclosure;

FIG. 19 shows an illustrative display generated by navigating the display of FIG. 18 by character and location, in accordance with some embodiments of the present disclosure;

FIG. 20 shows an illustrative display generated by further navigating the display of FIG. 19 by character and location, in accordance with some embodiments of the present disclosure;

FIG. 21 shows an illustrative display generated by altering the filter of the display of FIG. 20 by character and location, in accordance with some embodiments of the present disclosure; and FIG. 22 shows an illustrative display generated by rearranging the display of FIG. 17 by character and location, in accordance with some embodiments of the present disclosure.

DETAILED DESCRIPTION

Figure 2:
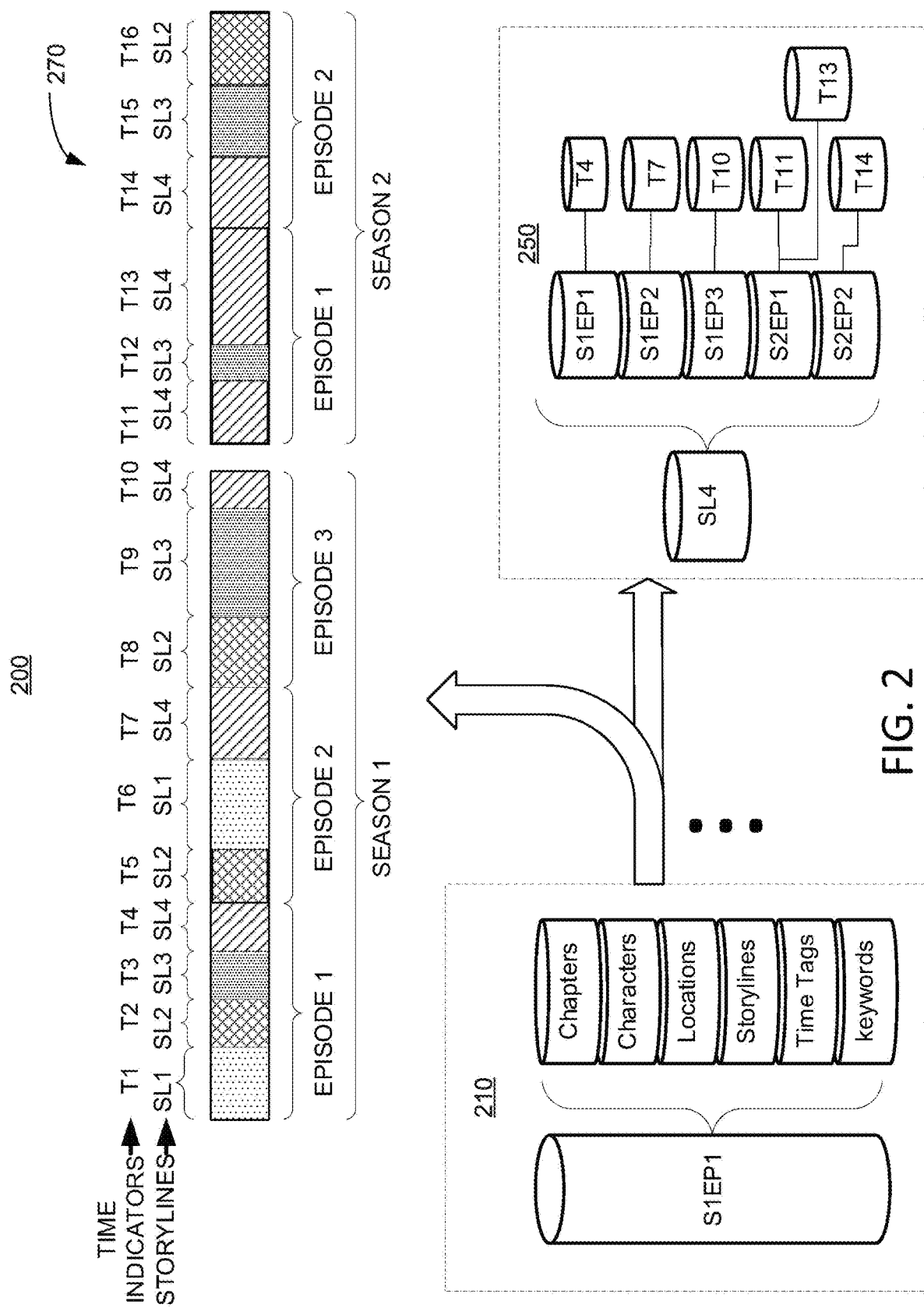
FIG. 2 shows a block diagram of an illustrative arrangement of data and metadata, in accordance with some embodiments of the present disclosure.

FIG. 1 shows illustrative display 100 including storyline identifiers, episode identifiers, and time indicators, in accordance with some embodiments of the present disclosure. For example, display 100 may be generated by control circuitry and be displayed by a display device coupled to the control circuitry. Display 100 provides an illustrative example of presented information relevant to a storyline, in accordance with some embodiments of the present disclosure.

As illustrated, display 100 includes a grid having two primary axes, axis 170 and axis 171, which are normal to each other. Arranged along axis 170 are a plurality of storylines. Arranged along axis 171 are a plurality of time indicators. The grid includes a plurality of episode identifiers, each corresponding to the storyline identifier of the same row. Each time indicator corresponds to the episode corresponding to the episode identifier of the same row as a selected storyline. For example, storyline "Daenerys Targeryen" (from the show "Game of Thrones") is selected on display 100, thus the time indicators correspond to episodes of the second row of episode identifiers. As illustrated, if the storyline selecting highlight is moved to a different storyline, the time indicators are updated to correspond to the new selected storyline. Accordingly, a user may select a storyline of interest and then be able to view corresponding episodes and segments of episodes (e.g., denoted by the time indicators) that are relevant to the storyline. Time indicators may be used to, for example, generate a timeline.

In some embodiments, as illustrated in FIG. 1, the time indicators are relative to each episode that corresponds to the selected storyline (e.g., indicating the time within the episode). In some embodiments, the time indicator shows, for each chapter in storyline, the start-stop play time of that chapter within the episode. In some embodiments, the time indicator shows a cumulative storyline play time. For example, the time indicators may start at 0:00 and increase from one segment to the next by the length of the chapter, segment, or section length. In some embodiments, the time indicator includes an events timeline within a storyline. For example, the system may reorder the chapters based on the intended time of events in the storyline, and display any date info available (e.g., 12$^{th}$ century, 100 BC, Summer 1976, December 1989, 12 May 2000, morning of 14 Jun. 2011, etc.). For example, intended times of a storyline may include elapsed times experienced by characters or events, and may cover much more time than the playback time duration. In some embodiments, the system generates a custom timeline based on time indicators. For example, a system may have access to a user's agenda or activities schedule, and accordingly may map one or more chapters to time slots of the user's schedule. In an illustrative example, the horizontal axis may show an actual calendar having events, with "evening relaxing time" empty slots during which the user can map particular content to be viewed. In a further example, the system may schedule an entire season of a program, or storyline thereof, to fit the time available during two connecting flights the user may have scheduled. Accordingly, the timeline may be constructed based on the program playback time, storyline playback time, in-storyline time, a user's scheduled time, any other suitable time reference, or any combination thereof.

FIG. 2 shows a block diagram of illustrative arrangement 200 of data and metadata, in accordance with some embodiments of the present disclosure. As illustratively shown in FIG. 2, media content and corresponding metadata (e.g., information 210) may be organized by storyline (e.g., according to storyline information 250), from which a timeline may be generated (e.g., timeline 270).

Information 210 includes video data for season 1 episode 1 (S1EP1), as well as metadata associated with S1EP1 such as chapters, characters, locations, storylines, time tags, keywords, any other suitable information, or any combination thereof. In some embodiments, chapter numbers, chapter titles, character names, actor names, location names, storylines, plots, start times, end times, time durations, keywords, key phrases, and any other suitable information may be included in metadata of information 210. To illustrate, a plurality of chapter numbers and titles of S1EP1 may each be defined, each having a corresponding start time and end time and a corresponding list of relevant characters and locations. For example, "Chapter 2" may be titled "The Season" and have a start time of "00:24:15," an end time of "00:38:10," and character tags "Oliver" and "Ms. Smith." Metadata may be stored and indexed using any suitable technique, file type, database type, field type, data structure, class structure, and format, having any suitable amount of data corresponding to S1EP1. Information 210 may be available for a plurality of episodes (e.g., episodes of one or more seasons, games of one or more tournaments, etc.). For example, an instance of information 210 may be stored for each episode. Data of S1EP1 may include audio data, video data, or both, in any suitable format. For example, data of S1EP1 may be formatted as an MP4 file, a WMV file, an AVI file, a WAV file, any other suitable encoding format, or any combination thereof. The system may include any suitable audio or video codec configured to compress, decompress, or both, the data files.

Based on metadata of information 210, for each of a plurality of episodes, storyline information 250 may be determined, stored (e.g., in memory), extracted (e.g., by a software application executing instructions on stored information), retrieved (e.g., from memory), or otherwise processed. Storyline information 250 may include a storyline identifier (e.g., such as storyline four "SL4"), episodes corresponding to the storyline, play times of each episode corresponding to the storyline, any other suitable information, or any combination thereof. For example, as illustrated, storyline SL4 spans episodes one to three of season one (e.g., S1EP1, S1EP2, S1EP3) and episodes one and two of season two (e.g., S2EP1, S2EP2). For each episode, a time indicator is illustrated that includes, for example, a start time, an end time, a duration, or a combination thereof. The time indicator may correspond to a time tag of metadata of information 210, which may in turn correspond to SL4 of storyline metadata of information 210. In some embodiments, storyline information 250 may correspond to a particular plot of the series (e.g., a storyline), a character (e.g., a character's storyline), a location (e.g., a location's storyline), any other suitable attribute, or any combination thereof. For example, storyline information may correspond to character X, and all episodes in which character X appears correspond to the storyline. Accordingly, each episode may belong to one or more storylines represented by a corresponding storyline identifier. As illustrated in FIG. 2, the time indicators corresponding to segments are exclusive to each other but need not be. For example, a particular plot arc may occur in more than one location, and accordingly, any of the time indicators may overlap.

Timeline 270 illustrates a chronological arrangement of the data of information 210, for a plurality of episodes and seasons, partitioned by storyline. As illustrated, four storylines are shown (e.g., SL1, SL2, SL3, and SL4), some of which extend through the first season. Each episode includes one or more segments, which may be attributed to one or more storylines. Each segment may be defined by a time indicator (e.g., T1, T2, T3, and T4 for S1EP1). The time durations to each segment may be, but need not be, the same. For example, in some circumstances, each episode may be partitioned into segments having the same duration (e.g., each one hour episode includes four segments of fifteen minutes each). In a further example, in some circumstances, each episode may be partitioned into segments that have differing lengths (e.g., the segments sum to one hour, but do not have the same durations).

In an illustrative example, referencing FIG. 2, series information (e.g., listing of episodes and/or seasons, metadata, storylines) of the entire series may be overwhelming or otherwise include more information than desired by a user viewing a display. Accordingly, the user may select a storyline, character, location, or other attribute (e.g., filter the information) to focus on information of interest. For example, the user may be interested in storyline four (SL4), corresponding to a particular plot arc. In some embodiments, the user indicates their interest in SL4 by interacting with a user interface of the system. The system may display or highlight information corresponding to SL4 and may hide or otherwise de-highlight other information. For example, the system may filter the display of episodes and seasons to show only those that correspond to the selected storyline.

In some embodiments, partitioning and presenting information by storyline allows the system to organize a video-on-demand (VOD) catalog for a complex event or series. A user may be overwhelmed by the amount of data that is being presented only by navigating from one episode to another on the catalog (e.g., a grid including all of the episodes and seasons). For example, the user might not have the time to watch all of the content. In an illustrative example, for the series Star Trek, the user may be interested only in episodes in which new physics theories are debated, or where the Q Entity shows up. In a further example, referencing Game of Thrones, a user might want to see the complete evolution of Daenerys Targaryen by skipping non-related segments or episodes, and binge watching only segments or plot arcs where she shows up. In a further example, a user may be a sports fan who wants to watch clips including a particular football player during a tournament or playoffs (e.g., a series of games the player played in) to analyze the player's technical style. The system may filter information of a series for display based on which, if any, metadata is available for the series. For example, episodes may have corresponding metadata describing the actual time where the action is taking place (e.g., a real playback time, a relative time, or a storyline time). The time axis in the TV Series Guide may be the actual time period during which the events in the series are taking place. For example, the "channels," or "rows," may include characters or clans/houses or other group of elements that take action, are used, evolve as the action occurs over the actual time. In some embodiments, the system may allow the user to unwind or otherwise parse a series that has, for example, intricate and multiple action threads, chapters not in particular time order, or other complexities. In some embodiments, the system may allow the user to play particular chapters related to predefined attributes such as major highlights, a particular character's presence, or a recurring locale.

Figure 3:
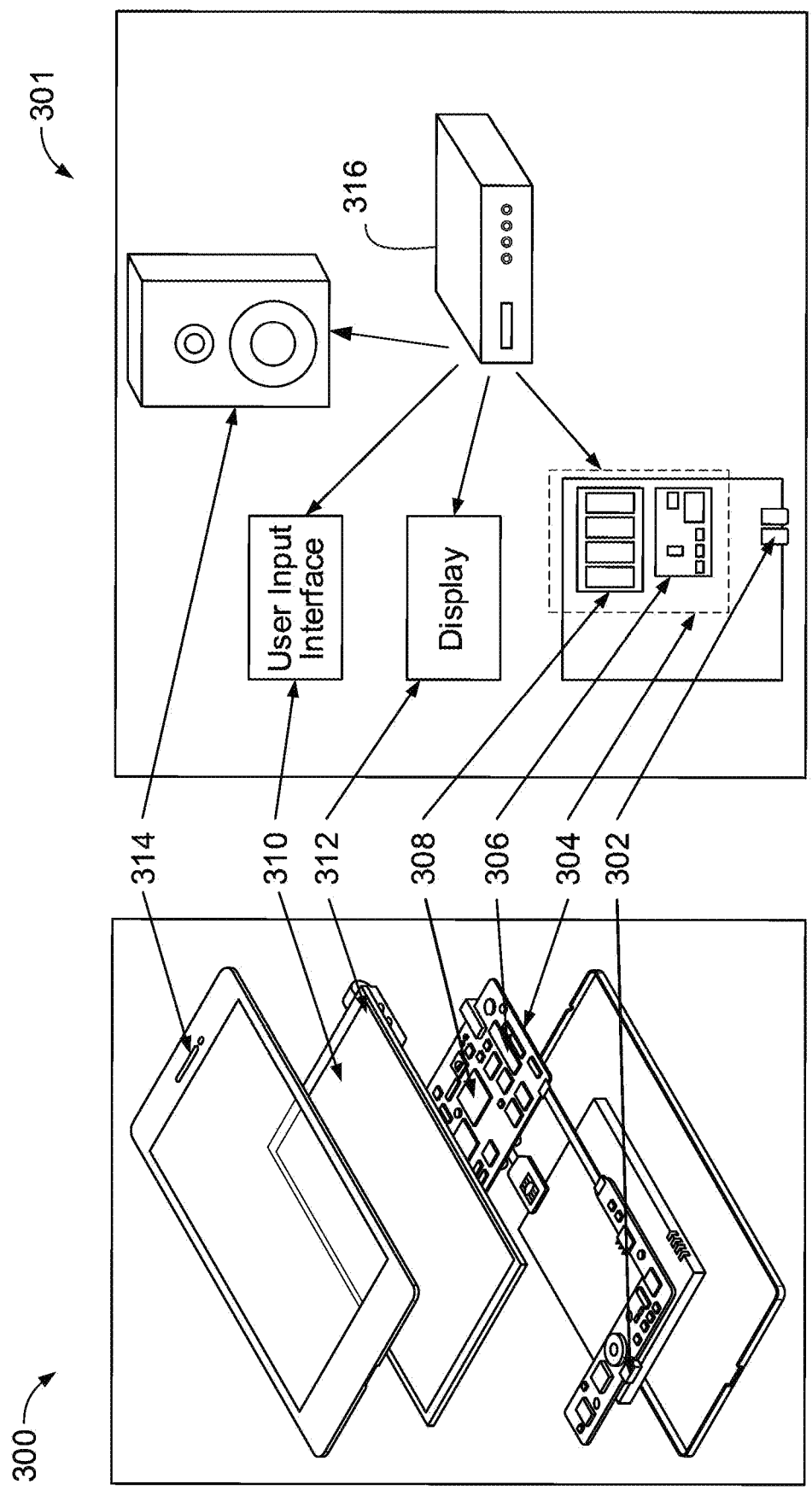
FIG. 3 is a block diagram of an illustrative user equipment, in accordance with some embodiments of the present disclosure.

A user may access content, an application, and other features from one or more of their devices (i.e., user equipment), one or more network-connected devices, one or more electronic devices having a display, or a combination thereof, for example. Any of the illustrative techniques of the present disclosure may be implemented by a user device, a device providing a display to a user, or any other suitable control circuitry configured to generate a display to a user of segmented content that may be filtered. FIG. 3 shows generalized embodiments of an illustrative user device. User equipment system 301 may include set-top box 316 that includes, or is communicatively coupled to, display 312, audio equipment 314, and user input interface 310. In some embodiments, display 312 may include a television display or a computer display. In some embodiments, user interface input 310 is a remote-control device. Set-top box 316 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of user equipment device 300 and user equipment system 301 may receive content and data via input/output (hereinafter "I/O") path 302. I/O path 302 may provide content and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing. While set-top box 316 is shown in FIG. 3 for illustration, any suitable computing device having processing circuitry, control circuitry, and storage may be used in accordance with the present disclosure. For example, set-top box 316 may replaced by, or complemented by, a personal computer (e.g., a notebook, a laptop, a desktop), a network-based server hosting a user-accessible client device, a non-user-owned device, any other suitable device, or any combination thereof.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an application stored in memory (e.g., storage 308). Specifically, control circuitry 304 may be instructed by the application to perform the functions discussed above and below. For example, the application may provide instructions to control circuitry 304 to generate the media guidance displays. In some implementations, any action performed by control circuitry 304 may be based on instructions received from the application.

In some client-server-based embodiments, control circuitry 304 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device such as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, for example, may be used to supplement storage 308 or instead of storage 308.

A user may send instructions to control circuitry 304 using user input interface 310. User input interface 310, display 312, or both, may include a touchscreen configured to provide a display and receive haptic input. For example, the touchscreen may be configured to receive haptic input from a finger, a stylus, or both. In some embodiments, equipment device 300 may include a front-facing screen and a rear-facing screen, multiple front screens, or multiple angled screens. In some embodiments, user input interface 310 includes a remote-control device having one or more microphones, buttons, keypads, any other components configured to receive user input or combinations thereof. For example, user input interface 310 may include a handheld remote-control device having an alphanumeric keypad and option buttons. In a further example, user input interface 310 may include a handheld remote-control device having a microphone and control circuitry configured to receive and identify voice commands and transmit information to set-top box 316.

Audio equipment 314 may be provided as integrated with other elements of each one of user device 300 and user equipment system 301 or may be stand-alone units. The audio component of videos and other content displayed on display 312 may be played through speakers of audio equipment 314. In some embodiments, the audio may be distributed to a receiver (not shown), which processes and outputs the audio via speakers of audio equipment 314. In some embodiments, for example, control circuitry 304 is configured to provide audio cues to a user, or other audio feedback to a user, using speakers of audio equipment 314. Audio equipment 314 may include a microphone configured to receive audio input such as voice commands or speech. For example, a user may speak letters or words that are received by the microphone and converted to text by control circuitry 304. In a further example, a user may voice commands that are received by the microphone and recognized by control circuitry 304.

An application (e.g., for generating a display) may be implemented using any suitable architecture. For example, a stand-alone application may be wholly implemented on each one of user device 300 and user equipment system 301. In some such embodiments, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application is a client-server-based application. Data for use by a thick or thin client implemented on each one of user device 300 and user equipment system 301 is retrieved on-demand by issuing requests to a server remote from each one of user equipment device 300 and user equipment system 301. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on user device 300. This way, the processing of the instructions is performed remotely by the server while the resulting displays (e.g., that may include text, a keyboard, or other visuals) are provided locally on user device 300. User device 300 may receive inputs from the user via input interface 310 and transmit those inputs to the remote server for processing and generating the corresponding displays. For example, user device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to user device 300 for presentation to the user.

In some embodiments, the application is downloaded and interpreted or otherwise run by an interpreter or virtual machine (e.g., run by control circuitry 304). In some embodiments, the application may be encoded in the ETV Binary Interchange Format (EBIF), received by control circuitry 304 as part of a suitable feed, and interpreted by a user agent running on control circuitry 304. For example, the application may be an EBIF application. In some embodiments, the application may be defined by a series of JAVA-based files that are received and run by a local virtual machine or other suitable middleware executed by control circuitry 304.

In some embodiments, a system may include a user interface, with processing occurring remotely (e.g., at a network entity). In some embodiments, an application for displaying storyline information may be implemented on one or more devices that do not include user devices. In some embodiments, control circuitry is configured to access content, identify storylines, and generate for display an informational presentation arranged in suitable way. To illustrate, in some embodiments, law enforcement officers may view a screen of a virtual reality (VR) capable device that has access (e.g., network connectivity, or other communicative access) to a city video surveillance database. Using the VR device (e.g., a headset, personal device, smartphone connected to a wearable display), a police officer may browse and filter the video feeds recorded from a series of cameras around the city, by type of action recorded (e.g., via metadata tags), people identified in the sequences (e.g., via metadata tags), vehicles or license plates thereof shown in the video segments, any other attribute of the video segments, or any combination thereof. Accordingly, rather than a plot arc and characters, the storyline may include action type, persons, articles of clothing, vehicles, items (e.g., stolen property), or other identifiable attributes of video segments. Further, in some embodiments, rather than segments describing portions of episodes of a program, segments may refer to recordings or video clips (e.g., divided into segments in any suitable partition). Further, in some embodiments, rather than program title, the system may present information corresponding to a set of cameras or other video sources.

In an illustrative example, a user on a flight may interact with an in-flight entertainment system (e.g., not a user device). The user may want to select the most interesting parts from a movie (e.g., storyline may correspond to "highlights"), for example, that fit within the remaining flight time. In some such embodiments, a device includes an in-plane VOD system, chair personal display and controls (e.g., buttons or a touchscreen). The techniques of the present disclosure may be implanted using any suitable control circuitry, display device, and storage, implemented in any suitable topology. In some embodiments, a system may use a gesture mechanism to capture user gestures to control the display and apply, remove, or otherwise change filters. For example, a user may zoom in on a particular cell of a grid using hand gestures and the grid may expand accordingly (e.g., as shown by the illustrative displays of FIGS. 17-18). In a further example, the user may swipe to navigate left, right, up, or down, or tap to select a cell of the grid. In a further example, the user may drag cells, attributes, metadata, or other displayed information to axes, thus changing the displayed grid (e.g., the user expands a cell by Character and Location as illustrated in FIGS. 17-18, then drags the location to the vertical axis, and pins Character 1 using a double tap, thus changing the view as illustrated in FIG. 22). Updating a view need not require switching to a separate screen of settings, filters, or other options. For example, updating a display may be performed on a given display, by applying various transformations directly in the displayed grid, in accordance with the present disclosure.

Figure 4:
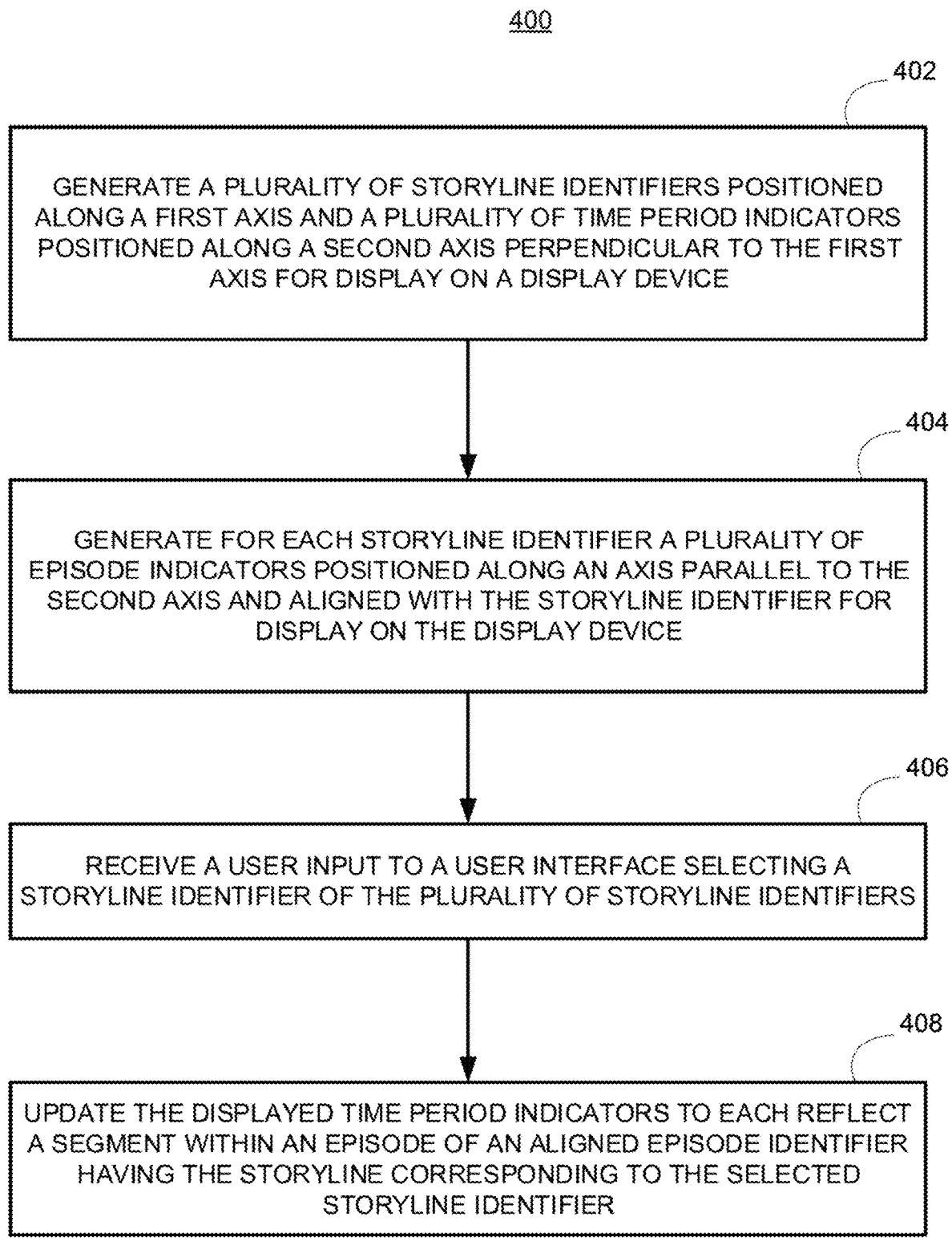
FIG. 4 is a flowchart of an illustrative process for indicating storyline information, in accordance with some embodiments of the present disclosure.

FIG. 4 is a flowchart of illustrative process 400 for indicating storyline information, in accordance with some embodiments of the present disclosure. The illustrative steps of process 400 may be performed by, for example, device 300 of FIG. 3, or control circuitry 304 thereof.

Step 402 includes control circuitry (e.g., control circuitry 304) generating a plurality of storyline identifiers positioned along a first axis and a plurality of time period indicators positioned along a second axis perpendicular to the first axis for display on a display device (e.g., display 312). For example, the first axis and the second axis may define a grid. In some embodiments, the control circuitry (e.g., control circuitry 304) generates the display based on unfiltered information (e.g., including any information that can be arranged on a display for the program). In some embodiments, the generated display includes a filtered display that is filtered by any suitable attribute of the program. For example, if the program includes a sports tournament, the attribute may be a particular team, and the first display includes only games of the tournament played by the particular team.

Step 404 includes the control circuitry (e.g., control circuitry 304) generating for each storyline identifier a plurality of episode indicators positioned along an axis parallel to the second axis and aligned with the storyline identifier for display on the display device (e.g., display 312). The plurality of episode identifiers may be displayed in the grid. Episode identifiers may include, for example, a season index, a season title, an episode index, an episode title, an episode description, a year, a date, a segment or chapter title, any other suitable information corresponding to an episode, or any combination thereof.

Step 406 includes the control circuitry (e.g., control circuitry 304) receiving a user input to a user interface (e.g., user input interface 310) selecting a storyline identifier of the plurality of storyline identifiers. In some embodiments, the system is configured to receive user input to a user interface (e.g., user input interface 310). The user input may include, for example, haptic input to a touchscreen, depression of buttons of a keypad, voice input to an audio interface (e.g., audio equipment 314), any other input by a user to the system, or any combination thereof. For example, a user may use directional keys on a keypad of a remote-control device configured to communicate with equipment device 300. In a further example, a user may provide a haptic selection on a touchscreen of user device 300. In some embodiments, the control circuitry is configured to wait for user input, or otherwise not change the display until user input is received. The user input may include, for example, a selection of one or more characters, one or more locations, one or more plot arcs, one or more teams, one or more players, any other suitable attribute, or any combination thereof.

Step 408 includes the control circuitry (e.g., control circuitry 304) updating the displayed time period indicators to each reflect a segment within an episode of an aligned episode identifier having the storyline corresponding to the selected storyline identifier. In some embodiments, the control circuitry (e.g., control circuitry 304) is configured to determine how to update the first display, if it is determined to update the first display. In some embodiments, step 408 includes the control circuitry (e.g., control circuitry 304) generating a second display if it is determined to update the first display. In some embodiments, the updated display is similar to the previous display except for the time period indicators.

In some embodiments, the control circuitry (e.g., control circuitry 304) determines whether to update the display at step 408. In some embodiments, the control circuitry (e.g., control circuitry 304) may determine to what extent the desired time indicators are displayed. For example, if the first display is not easily parsed or reduced in content with further filtering, the system may determine not to update the first display. In some circumstances, the control circuitry may determine not to update or otherwise change the first display (e.g., and may await further user input). In some embodiments, step 408 includes the control circuitry (e.g., control circuitry 304) determining how to update the first display, if it is determined to update the first display. For example, the control circuitry (e.g., control circuitry 304) may determine that a displayed grid in the first display is to remain displayed but highlights or other visual attributes may be applied to draw the user's attention to particular information. In some embodiments, the control circuitry may determine that an entirely new grid is to be displayed, maintaining only some features or characteristics, or no features and characteristics, of the first display. In some embodiments, the control circuitry (e.g., control circuitry 304) is configured to generate a second display if it is determined to update the first display. In some embodiments, the control circuitry (e.g., control circuitry 304) generates a second display to filter the first display to include information more focused or relevant to the selected storyline of step 406. In some embodiments, the control circuitry causes a transition from the first display to a second display using any suitable technique. For example, the control circuitry may cause rearrangement of displayed features, removal of displayed features, addition of displayed features, zooming in or out of portions of the first display, or otherwise providing a transition from the first display to the second display. In a further example, the control circuitry may cause removal of information (e.g., episodes or segments thereof) that no longer corresponds to the selected storyline.

Figure 5:
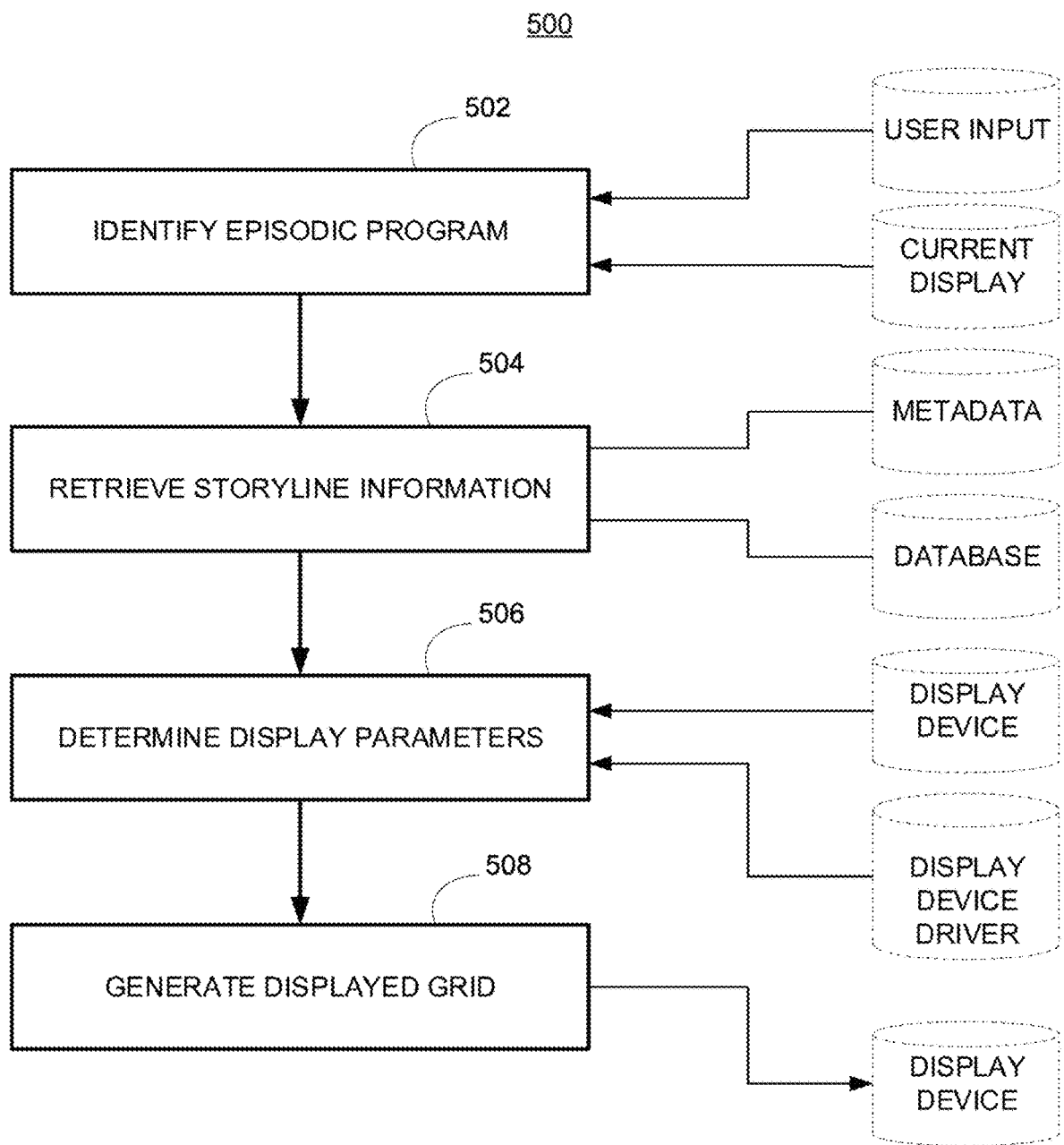
FIG. 5 is a flowchart of an illustrative process for generating a display of storyline information, in accordance with some embodiments of the present disclosure.

FIG. 5 is a flowchart of illustrative process 500 for generating a display of storyline information, in accordance with some embodiments of the present disclosure. The illustrative steps of process 500 may be performed by, for example, device 300 of FIG. 3, or control circuitry 304 thereof.

Step 502 includes the control circuitry (e.g., control circuitry 304) identifying an episodic program. In some embodiments, an episodic program has corresponding metadata that indicates the program is episodic. In some embodiments, the control circuitry (e.g., control circuitry 304) identifies that one or more seasons, episodes, or both, of a program are available and accordingly identifies a program as episodic. In some embodiments, the control circuitry (e.g., control circuitry 304) receives a user selection of a program and, in response to the selection, determines if the program is episodic. For example, a user may select a displayed program identifier, and the control circuitry may then generate for display a grid of available episodes and seasons of the program. In some embodiments, the control circuitry may display data in the grid based on a level of interaction with the user. For example, a video surveillance system may display a grid of segments from video sources (e.g., street cameras) using a timeline grid. Then, as the user filters by location, type of content (e.g., segments with pedestrians or segments with black cars), or other attribute, the system will modify the display to show a particular type of car by time, filtered by location. For example, this type of display may allow user to see all related recordings that show a suspect's vehicle or a fugitive. This type of filtering may be implemented in a similar manner as compared to filtering Game of Thrones for John Snow-related segments or chapters from season 3 of the show.

Step 504 includes the control circuitry (e.g., control circuitry 304) retrieving storyline information for a program. In some embodiments, the control circuitry (e.g., control circuitry 304) retrieves the storyline information for the program in response to identifying the program at step 502. For example, the system may retrieve the storyline information from local memory (e.g., a local hard disk drive, solid state hard drive, or storage 308), a database (e.g., local or remote), a network device (e.g., a server, cloud-based computing device, or central computing device), any other suitable data source, or any combination thereof. In some embodiments, for example referencing FIG. 2, the control circuitry may retrieve storyline information 250 for a plurality of storylines from any suitable memory (e.g., storage 308). In a further example, the control circuitry (e.g., control circuitry 304) may retrieve information 210 for a plurality of episodes and construct, and store in memory (e.g., storage 308), storyline information 250 for one or more storylines based on information 210. In a further example, the control circuitry (e.g., control circuitry 304) may retrieve (e.g., from storage 308) information 210 for a plurality of episodes and generate timeline 270, or any other suitable timeline-like data object, and store timeline 270 in memory (e.g., storage 308), in preparation for generating a display. In some embodiments, metadata corresponding to the video content may be generated using artificial intelligence (AI) processes, configured to tag content as it is produced. For example, in the context of the street camera video database, wherein the video feeds from the street cameras is inputted into a trained AI application that generates tags for identified persons, identified car license plates, motion/movement, any other suitable identifiable attribute of the video feeds, or any combination thereof. In some embodiments, storyline information may be generated during or shortly after content generation (e.g., preprocessing recordings or episodes), at content airing (e.g., before, during, or after), at content recording, or a combination thereof. For example, as a scheduled recording (e.g., of a new episode for a TV Series) is performed on a user device, metadata is extracted, along with chapters and other suitable information and the display is constructed incrementally, as new data is added. Further, in some embodiments, as the user browses a recordings database and indicates interest in a particular type of fragmentation or arrangement of the content information, the system may determine a new fragmentation or arrangement of the display. Accordingly, as more data is generated, the data may be displayed in a different arrangement, which may be, but need not be, based on user preferences.

Step 506 includes the control circuitry (e.g., control circuitry 304) determining display parameters. In some embodiments, the system includes or is coupled to a display device (e.g., display 312) configured to provide a visual display of information to the user. In some embodiments, the control circuitry determines display parameters to determine how to organize, arrange, configure, or otherwise present information. Display parameters may include, for example, screen size, zoom extent, pixel count or resolution, available colors or color palette, user preferences, any other suitable parameters for generating a display, or any combination thereof. In some embodiments, the display device (e.g., display 312) provides required or suggested display parameters to control circuitry (e.g., control circuitry 304) of the system. In some embodiments, a software driver or other software includes display parameters for generating a display. For example, a graphics card or other suitable hardware controller may determine display parameters based on properties of the display device (e.g., display 312) and the information to be displayed on the display device (e.g., display 312). In some embodiments, depending on the display type, size and layout, the control circuitry modifies a pitch, size, level of detail, or other aspect of a displayed grid. For example, in some embodiments, the control circuitry replaces a grid timeline with one or more simple markers, configured to indicate transitions between segments. In some embodiments, for example, if a display is large enough and includes suitable resolution, the control circuitry may generate for display a nested grid within a primary grid cell. For example, nested grids may include groups of cells inserted into the main grid (e.g., when filtered or zoomed in) or collapsed into a single cell (e.g., when unfiltered, or zoomed out).

Step 508 includes the system generating a displayed grid. In some embodiments, the control circuitry (e.g., control circuitry 304) of the system transmits video data to the display device (e.g., display 312) to generate a display on the display device (e.g., display 312). The display may include storyline identifiers, episode identifiers, time indicators, any other suitable features, or any combination thereof. For example, the control signal may transmit a high-definition multimedia interface (HDMI) signal to the display device (e.g., display 312), over a suitable cable or connection, to generate a grid including the episode identifiers (e.g., similar to display 100 of FIG. 1). In some embodiments, the control circuitry (e.g., control circuitry 304) may update an existing display on a display device (e.g., display 312). For example, a first display may be presented on a display device (e.g., display 312), and the control circuitry (e.g., control circuitry 304) may update the first display to a second display by transmitting a video signal having some portions updated and some portions similar or maintained as before. In some embodiments, the control circuitry generates a grid for display that is configured to fit into a target space on the display device. For example, a split screen may be used to display information (e.g., including a main feed, auxiliary feeds, and a summary table). The control circuitry may populate the summary table with data based on video content and filters, updating the summary table as data is received, and providing browse, search, play, navigation, or other functionality for already-recorded and categorized segments. For example, the display may show relevant chapters for tracked targets, or highlight events for a set of input feeds (e.g., live events, street cameras, or processed recordings). In some embodiments, for example, the control circuitry generates for display a collapsible grid with dynamic columns and rows, wherein the episodes of the program may be considered the video feed, and a character, plot arc, location, or other attribute is a tracked target.

Figure 6:
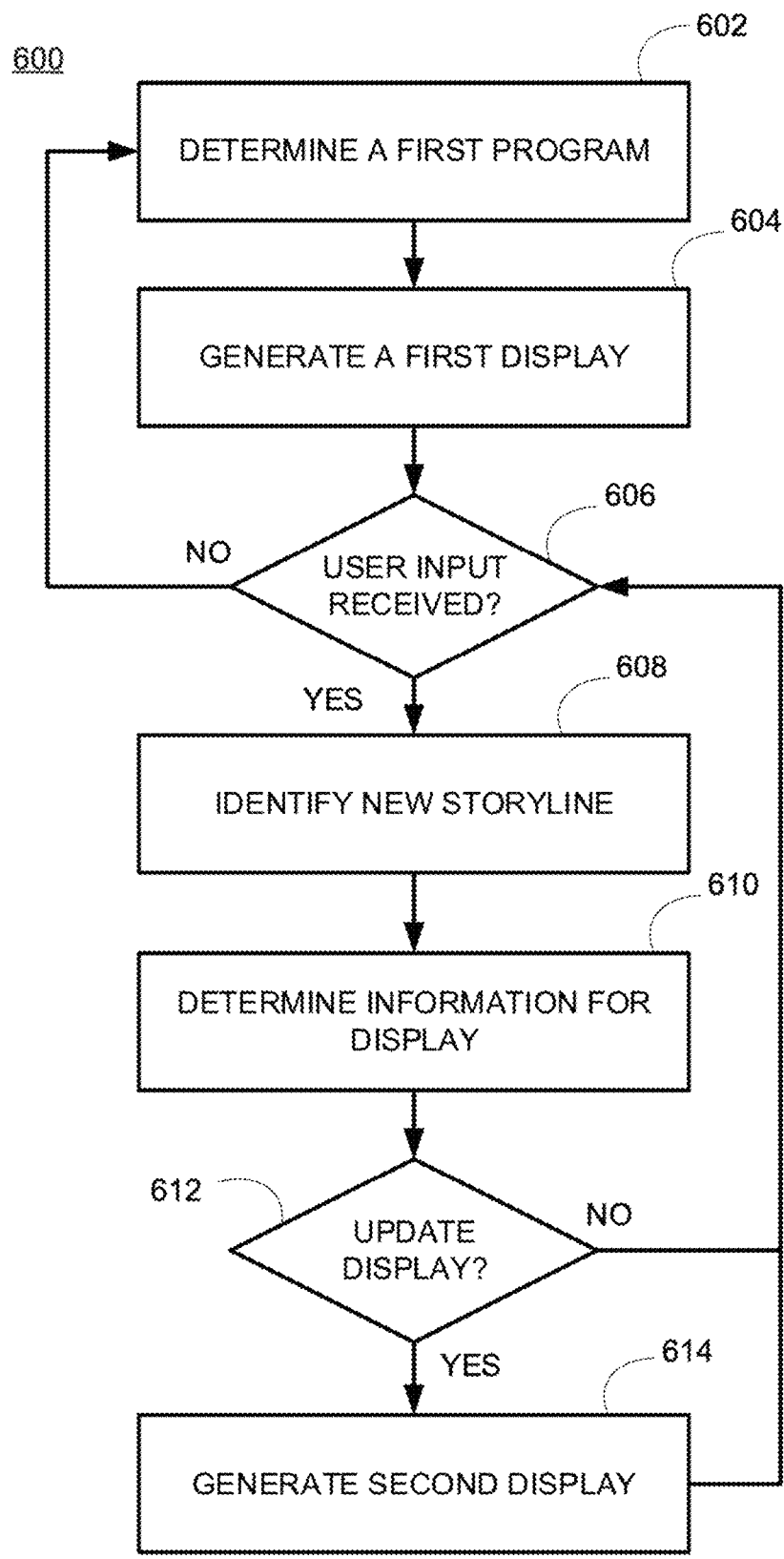
FIG. 6 is a flowchart of an illustrative process for managing a display of storyline information, in accordance with some embodiments of the present disclosure.

FIG. 6 is a flowchart of illustrative process 600 for managing a display of storyline information, in accordance with some embodiments of the present disclosure. The illustrative steps of process 600 may be performed by, for example, device 300 of FIG. 3, or control circuitry 304 thereof.

Step 602 includes the control circuitry (e.g., control circuitry 304) determining a first program. In some embodiments, the control circuitry (e.g., control circuitry 304) determines the first program based on which program is currently highlighted by a displayed cursor. In some embodiments, the control circuitry (e.g., control circuitry 304) determines the first program based on user input. In some embodiments, the control circuitry (e.g., control circuitry 304) determines the first program based on which program is currently being displayed, was previously displayed, is tuned to, or is otherwise highlighted relative to other programs. For example, in some embodiments, step 602 may include any aspect of illustrative step 502 of FIG. 5 (e.g., identifying an episodic program).

Step 604 includes the control circuitry (e.g., control circuitry 304) generating a first display. In some embodiments, the first display is unfiltered, including any information that can be arranged on a display. In some embodiments, the control circuitry (e.g., control circuitry 304) of the system transmits video data to the display device (e.g., display 312) to generate the first display on the display device (e.g., display 312). The display may include storyline identifiers, episode identifiers, time indicators, any other suitable features, or any combination thereof. For example, the control signal may transmit a high-definition multimedia interface (HDMI) signal to the display device (e.g., display 312), over a suitable cable or connection, to generate a grid including the episode identifiers (e.g., similar to display 100 of FIG. 1). In some embodiments, the first display may include a filtered display that is filtered by any suitable attribute of the program. For example, if the program includes a sports tournament, the attribute may be a particular team, and the first display includes only games of the tournament played by the particular team.

Step 606 includes the control circuitry (e.g., control circuitry 304) determining if user input has been received. In some embodiments, the control circuitry (e.g., control circuitry 304) is configured to receive user input to a user interface (e.g., user input interface 310). The user input may include, for example, haptic input to a touchscreen, depression of buttons of a keypad, voice input to an audio interface (e.g., audio equipment 314), any other input by a user to the system, or any combination thereof. For example, a user may use directional keys on a keypad of a remote-control device configured to communicate with equipment device 300. In a further example, a user may provide a haptic selection on a touchscreen of user device 300. In some embodiments, the system is configured to wait for user input, or otherwise not change the display until user input is received.

Step 608 includes the control circuitry (e.g., control circuitry 304) identifying a new storyline based on the user input. In some embodiments, the control circuitry (e.g., control circuitry 304) determines which storyline a user has selected based on the user input. In some embodiments, the user may provide a text-based input indicating the storyline of interest. For example, the user may input one or more keywords or phrases describing the storyline. In a further example, the user may input a selection of one storyline among a plurality of storyline options (e.g., by manipulating an on-screen cursor or other highlighting tool). In a further example, the user may input a voice command specifying a keyword, phrase, or command, and the system may process the audio information to identify keywords and match the keywords to data tags or metadata tags, match the audio information to a predetermined voice command of a plurality of predetermined voice commands, or both, to identify the new storyline.

Step 610 includes the control circuitry (e.g., control circuitry 304) determining information for display based on the new storyline. In some embodiments, the control circuitry (e.g., control circuitry 304) determines information for display by applying one or more filters to information included in the first display. For example, if the program includes a sports tournament and the first display corresponds to an attribute that may be a particular team (e.g., only games played by the particular team are displayed), the new storyline may include a player on the particular team.

Accordingly, the control circuitry may filter the display of games played by the particular team to only games, or segments of games, during which the player is on the field. In a further example, the new storyline may correspond to a new team, different from the particular team. In some embodiments, the control circuitry (e.g., control circuitry 304) determines what information corresponds to the new storyline, irrespective of what is included in the first display. For example, the new storyline may be selected by the user and the control circuitry may, in response, determine which information is to be displayed.

Step 612 includes the control circuitry (e.g., control circuitry 304) determining whether to update the first display. In some embodiments, the control circuitry (e.g., control circuitry 304) determines whether the information determined at step 610 is already displayed or is sufficiently displayed. In some embodiments, the control circuitry (e.g., control circuitry 304) may determine to what extent information not of the determined information of step 610 is included in the first display. For example, if the first display is not easily parsed or reduced in content with further filtering, the control circuitry (e.g., control circuitry 304) may determine not to update the first display. In some circumstances, the control circuitry (e.g., control circuitry 304) may determine not to update or otherwise change the first display (e.g., and may await further user input). For example, the control circuitry may return to step 602, 604, or 606 (e.g., as illustrated).

In some embodiments, step 612 includes the control circuitry (e.g., control circuitry 304) determining how to update the first display, if it is determined to update the first display. For example, the control circuitry (e.g., control circuitry 304) may determine that a displayed grid in the first display is to remain displayed but highlights or other visual attributes may be applied to draw the user's attention to particular information (e.g., the information of step 610). In some embodiments, the system may determine that an entirely new grid is to be displayed, maintaining only some features or characteristics, or no features and characteristics, of the first display.

Step 614 includes the control circuitry (e.g., control circuitry 304) generating a second display if it is determined to update the first display. In some embodiments, the control circuitry (e.g., control circuitry 304) generates the second display to filter the first display to include information more focused or relevant to the new storyline of step 608. In some embodiments, the control circuitry (e.g., control circuitry 304) transitions from the first display to a second display using any suitable technique. For example, the control circuitry (e.g., control circuitry 304) may rearrange displayed features, remove displayed features, add displayed features, zoom in or out of portions of the first display, or otherwise provide a transition from the first display to the second display. In a further example, the control circuitry (e.g., control circuitry 304) may remove information (e.g., episodes or segments thereof) that no longer corresponds to the storyline (e.g., the new storyline of step 608).

In some embodiments, process 600 allows a user to filter the display, and continuously refine the displayed data based on selection filters. For example, a first display may show grid cells corresponding to the episode level (e.g., each grid entry corresponds to an episode), and as the user filters the grid, the grid entries expand from episodes to chapters or segments within episodes, acts and even scenes depending upon the resolution. As the user zooms out (e.g., by removing filters), the grid entries may become collapsed into coarser grained cells (e.g., back to episodes rather than portions thereof). In some embodiments, filtering the display may include changing one or both axes of a grid. For example, during filtering, the display may change from a grid showing a program based on episodes' time to a grid showing segments corresponding to characters based on an in-story event's timeline.

Figure 7:
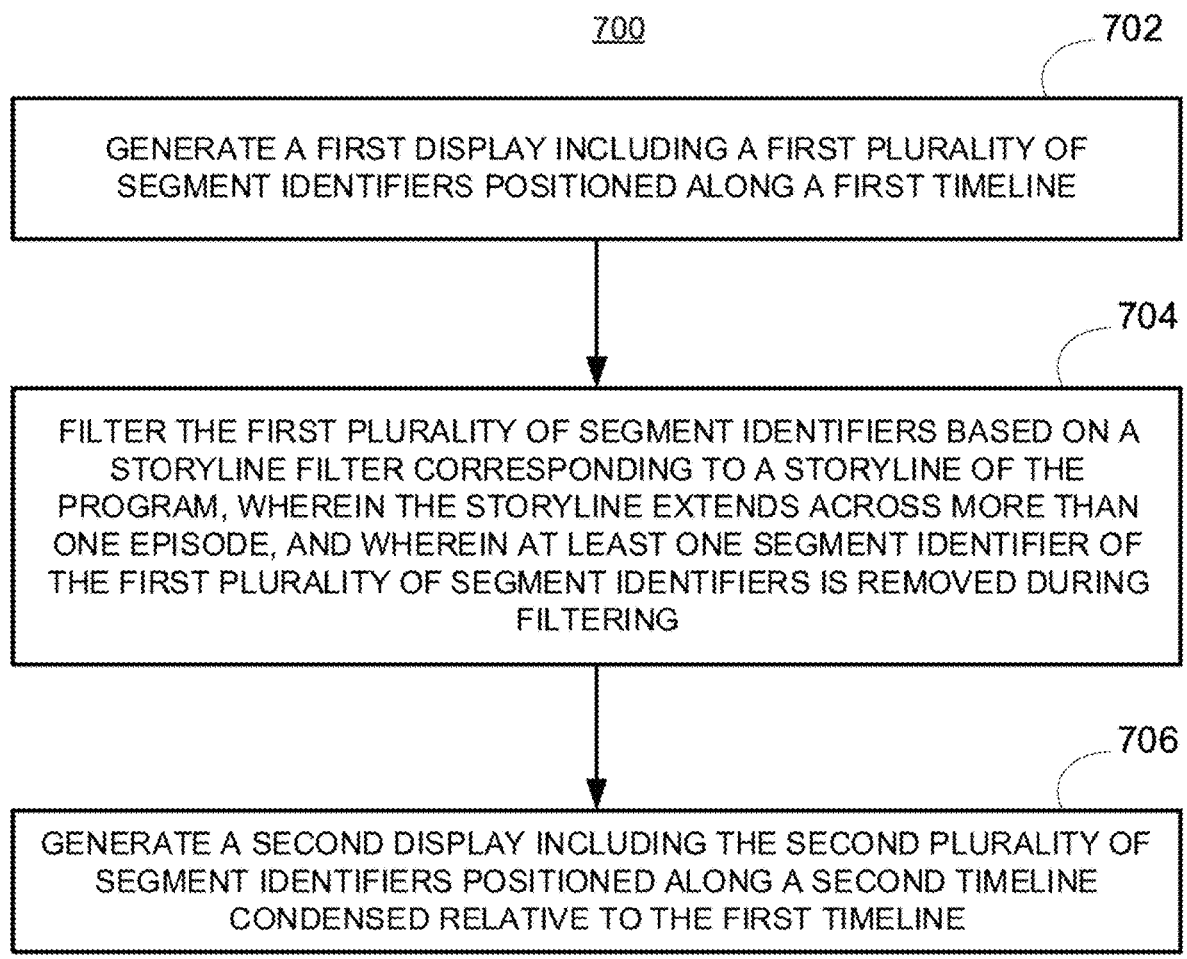
FIG. 7 is a flowchart of an illustrative process for filtering information for display based on a storyline, in accordance with some embodiments of the present disclosure.

FIG. 7 is a flowchart of illustrative process 700 for filtering information for display based on a storyline, in accordance with some embodiments of the present disclosure. The illustrative steps of process 700 may be performed by, for example, device 300 of FIG. 3, or control circuitry 304 thereof.

Step 702 includes the control circuitry (e.g., control circuitry 304) generating a first display including a first plurality of segment identifiers positioned along a first timeline. A segment identifier identifies a segment of an episode by title, time indicator, chapter number, any other suitable identifier, or any combination thereof. For example, a segment may include a portion of, or all of, an episode (e.g., an episode includes at least one segment, and in some circumstances more than one segment). In some embodiments, the control circuitry (e.g., control circuitry 304) generates a grid-based display having a timeline (e.g., a time axis) and a grouping (e.g., a storyline axis or channel axis). In some embodiments, the display includes a display of segment identifiers for a program, arranged horizontally by episode and season index into rows, with each row corresponding to a storyline. In some embodiments, the control circuitry may generate for display a grid, with a portion of the grid being empty or sparse. In some embodiments, a grid includes more than one region, corresponding to a sub-grid. For example, a grid may include a listing of seasons, and depending upon which season is selected, another region of the grid may display episodes, or segments thereof, corresponding to a selected season. In some embodiments, the grid may be divided based on which filters are applied, with at least one region of the grid configured to display information corresponding to a selected storyline. Content information may include, for example, segment identifiers (e.g., episode identifiers, chapter identifiers, segment descriptions, segment plot, segment title, segment characters, segment length or duration, episode year), which filters are currently applied, program information (e.g., information about the program as a whole such as producer, year, rating), time indicators (e.g., time period indicators for episodes), storyline information (e.g., storyline identifier, storyline description, storyline)

Step 704 includes the control circuitry (e.g., control circuitry 304) filtering the first plurality of segment identifiers based on a storyline filter corresponding to a storyline of the program. In some embodiments, step 704 includes the control circuitry (e.g., control circuitry 304) determining one or more storyline filters to apply to the segment identifiers of step 702. In some embodiments, storyline filters are based on user input received at a user interface (e.g., user input interface 310). A storyline filter includes, for example, a character filter, a location filter, a plot arc filter, a team filter, a player filter, a keyword filter, any other suitable filter, or any combination thereof. In some embodiments, a storyline extends across more than one episode. In some embodiments, step 704 includes the control circuitry (e.g., control circuitry 304) removing at least one segment identifier of the first plurality of segment identifiers. In some embodiments, the control circuitry (e.g., control circuitry 304) compares corresponding storylines for segments of the first plurality of segment identifiers to determine which do not correspond to the storyline filter.

Step 706 includes the control circuitry (e.g., control circuitry 304) generating a second display including the second plurality of segment identifiers positioned along a second timeline condensed relative to the first timeline. In some embodiments, because the second plurality of segment identifiers are reduced in number as compared to the first plurality of segment identifiers, more segment identifiers may be included in the second display. In some embodiments, because the second plurality of segment identifiers are reduced in number as compared to the first plurality of segment identifiers, the second plurality of segment identifiers may be displayed in a grid of reduced size (e.g., compared to the first display), and thus a condensed timeline may be used. For example, the timeline may be an index of actual playback time of the segments when arranged chronologically. In a further example, the timeline may be an index of segment numbers when arranged chronologically. In some embodiments, although not shown in FIG. 7, a timeline need not be condensed after storyline filters are applied. For example, the same timeline may be applied before and after filtering.

In an illustrative example, referencing an episodic program, the control circuitry may generate a grid for display that includes all of the episodes and seasons. The control circuitry (e.g., control circuitry 304) may receive user input, selecting a subset of characters of interest. Accordingly, the control circuitry (e.g., control circuitry 304) may apply a character filter to the set of all episodes and generate a new display of only those episodes that include at least one character of the subset of characters. If the control circuitry (e.g., control circuitry 304) receives further user input selecting additional filters, the system updates the display to show only episodes or segments thereof that correspond to the additional filters. In some embodiments, the display may include one or more selectable filters with which the user may interact (e.g., select/deselect, specify, or otherwise provide input) to modify the display (e.g., to display more information, less information, or more relevant information).

In an illustrative example of process 400, 500, 600, and 700 of FIGS. 4-7, a display may be generated for a television series. The display may include a two-dimensional grid. For example, each row may correspond to a season of the series, and each column may correspond to a chapter or plot from each episode. The timeline may be defined by each episode's duration, or portions thereof. A filter may be applied to show only chapters or plots that correspond to a particular attribute such as, for example, an action type, a plot highlight, a character, a location, or any other attribute or combination of attributes.

In an illustrative example of process 400, 500, 600, and 700 of FIGS. 4-7, a display may be generated for a television series that includes characters, character clans, and locations. The display may include a two-dimensional grid. Each row may correspond to one or more characters, one or more clans, one or more locations, any other suitable attribute, or any combination thereof. Each entry in a column is a chapter or plotline corresponding to the attribute of the row. The timeline may be given by actual storyline timeline (e.g., as presented in the episodes chronologically) that orders the events accordingly. One or more filters may be applied, corresponding to particular attributes of the chapters and plotlines (e.g., action type, highlights, intersections with other characters).

In an illustrative example of process 400, 500, 600, and 700 of FIGS. 4-7, a display may be generated for a television series that includes characters, character clans, and locations. The display may include a two-dimensional grid. Each row may correspond to one or more characters, one or more clans, one or more locations, any other suitable attribute, or any combination thereof. Each entry in a column is a chapters or plotline corresponding to the attribute of the row. The timeline is given by the actual seasons and episodes numbering. For example, the columns may be arranged by episode index (e.g., one, two, three, etc.) and season index (e.g., one, two, three, etc.). One or more filters may be applied based on particular attributes of the chapters or plotlines (e.g., action type, highlights, intersections with other characters), and the system displays the corresponding episodes, indexes and segments. Accordingly, the user can binge watch from one episode to another, in the release order, skipping to only chapters that correspond to the filters.

In an illustrative example of process 400, 500, 600, and 700 of FIGS. 4-7, a display may be generated for a sport series (e.g., a championship playoff or tournament) that includes teams and players. The display may include a two-dimensional grid. Each row may correspond to a league or bracket, and each entry in a column may correspond to a game/event, quarter thereof, half thereof, inning thereof, lap thereof, or round thereof. The timeline is given by the game position in the tournament (e.g., game index), an actual time of the event, or both. One or more filters may be applied that correspond to one or more particular teams, one or more particular players, any other particular attributes (e.g., action type, highlights, location), or any combination thereof.

It should be noted that any of the illustrative steps and processes of FIGS. 4-7 may be combined, omitted, or otherwise modified, and are not limited to the devices or control components described herein. For example, any of the illustrative steps of FIGS. 4-7 may be used to generate any of the illustrative displays of FIGS. 8-16.

Figure 8:
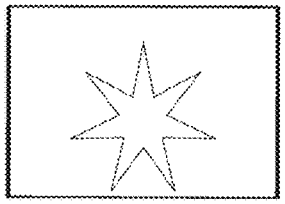
FIG. 8 shows an illustrative display with a character filter applied, in accordance with some embodiments of the present disclosure.

FIG. 8 shows illustrative display 800 with a character filter applied, in accordance with some embodiments of the present disclosure. For example, for a selected program titled "Episodic Program 1," there exist a plurality of episodes and a plurality of seasons (e.g., more than four seasons in this example). Display 800 includes a grid that includes season/episode identifiers, time indicators, or both, that correspond to episodes, and optionally segments thereof, in which Actor A is featured. Further, there are three plot arcs (e.g., SL1, SL2, and SL3) that include Actor A, and accordingly each column includes an episodic identifier, a time period indicator, or both, corresponding to the plot arc identified at the top of the column. For example, Actor A appears in S1EP1, S1EP2, S2EP1, S2EP2, S2EP5, S3EP2, S4EP1, S4EP2, and S4EP3 at least. In a further example, plot arc SL1 appears in S1EP1, S2EP1, and S4EP2 at least. The horizontal timeline used for each row corresponds to chronological episode index for each plot arc. In some embodiments, for example, the system may provide a display similar to display 800, but not partitioned by plot arc to simplify the timeline rather than indexing the timeline by plot arc. In some embodiments, each row may correspond to a season (e.g., as illustrated in FIG. 8), but need not be. For example, the system may designate each row for a storyline (e.g., a plot arc or character) rather than include the storyline partitioning along the horizontal axis.

Figure 9:
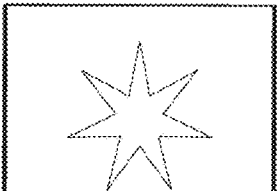
FIG. 9 shows an illustrative display with a character filter and a plot arc filter applied, in accordance with some embodiments of the present disclosure.

FIG. 9 shows illustrative display 900 with a character filter and a plot arc filter applied, in accordance with some embodiments of the present disclosure. For example, display 900 may be generated by filtering display 800 to maintain only episode identifiers, time period indicators, or both, that correspond to episodes including Character A and including plot arc SL2. The user may now interact with display 900 to select and watch episodes that include plot arc SL2 and Character A, rather than having to watch the program linearly to follow plot arc SL2 among other plot arcs.

Figure 10:
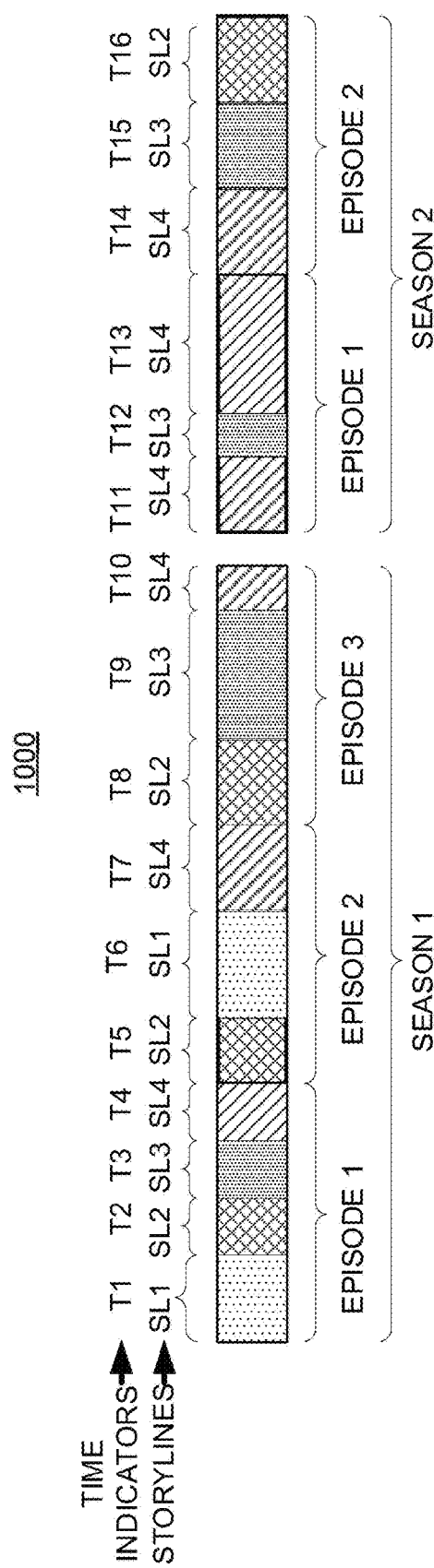
FIG. 10 shows an illustrative timeline of chronologically arranged segments of episodes of a program, in accordance with some embodiments of the present disclosure.

FIG. 10 shows illustrative timeline 1000 of chronologically arranged segments of episodes of a program, in accordance with some embodiments of the present disclosure. Timeline 1000 may be the same as timeline 270 of FIG. 2. As illustrated in FIG. 10, timeline 1000 includes, at least, seasons one and two (e.g., SEASON 1 and SEASON 2), and corresponding episodes (e.g., EPISODE 1, EPISODE 2, etc.). Each episode includes at least one segment having a time indicator (e.g., T1-T16 as illustrated). The segments are tagged as corresponding to one of four storylines (e.g., SL1, SL2, SL3, and SL4). Timeline 1000 is linear and may extend to a length that would prove difficult for a user to view, parse, follow or otherwise interact with. For example, if the program included ten seasons, displaying the timeline would likely overwhelm the user if the user was interested in a particular attribute.

Figure 11:
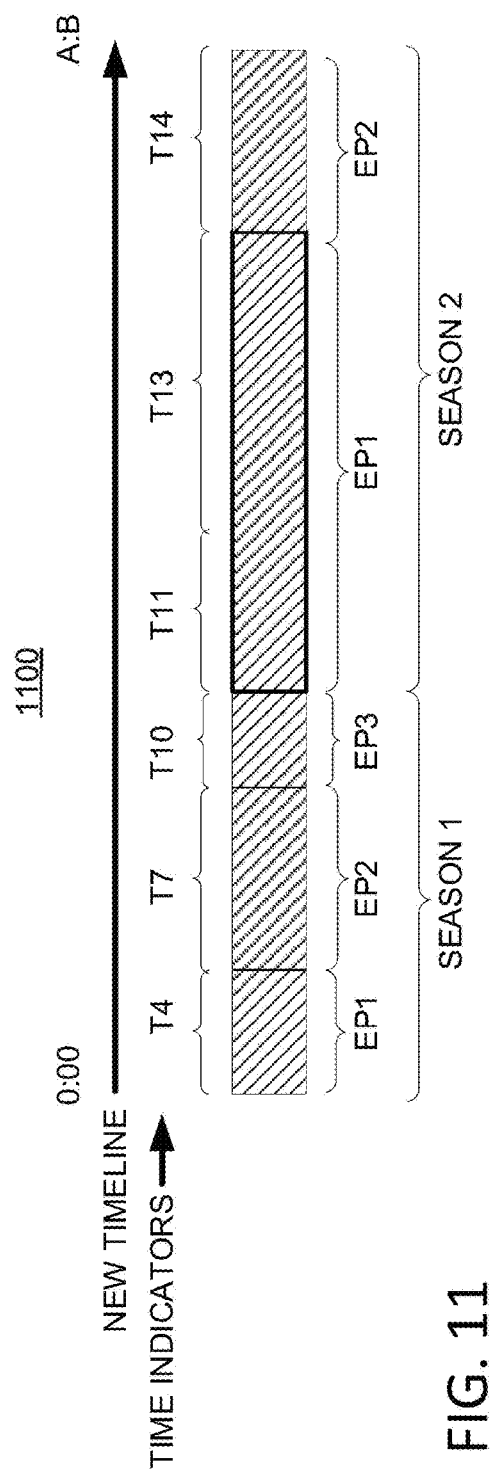
FIG. 11 shows an illustrative timeline of chronologically arranged segments of episodes of a program corresponding to a particular storyline, in accordance with some embodiments of the present disclosure.

FIG. 11 shows illustrative timeline 1100 of chronologically arranged segments of episodes of a program corresponding to a particular storyline of timeline 1000 of FIG. 10, in accordance with some embodiments of the present disclosure. For example, by filtering timeline 1000 by storyline SL4, illustrative timeline 1100 is achieved. Accordingly, the user may select to watch the program along timeline 1100 by selecting the segments having time indicators T4, T7, T10, T11, T13, and T14, which may be conveniently displayed as a single timeline (e.g., timeline 1100). In some embodiments, the system may rescale the time axis to correspond to actual playtime of timeline 1100 (e.g., which is shorter than timeline 1000 as illustrated). In some embodiments, the system may group the segments of timeline 1100 and provide an option to the user to watch the entire segments of timeline 1100 as a single sub-program (e.g., without selecting each segment in order, but rather by selecting a single option).

FIG. 12 shows illustrative display 1200 including a grid having sub-grids 1210 and 1220, in accordance with some embodiments of the present disclosure. For example, sub-grid 1210 includes a list of seasons of a program. User selection 1201 highlights season 2, episode 1. Shown in sub-grid 1220 is a listing of the segments of season 2, episode 1 with time indicators (e.g., segment start times of 0 min, 10 min, 20 min, 30 min, 40 min) and segment titles (e.g., chapter titles of "On Dragonstone," "In the Riverlands," "At Winterfall," "Beyond the Wall," "In the Red-Waste").

Figure 13:
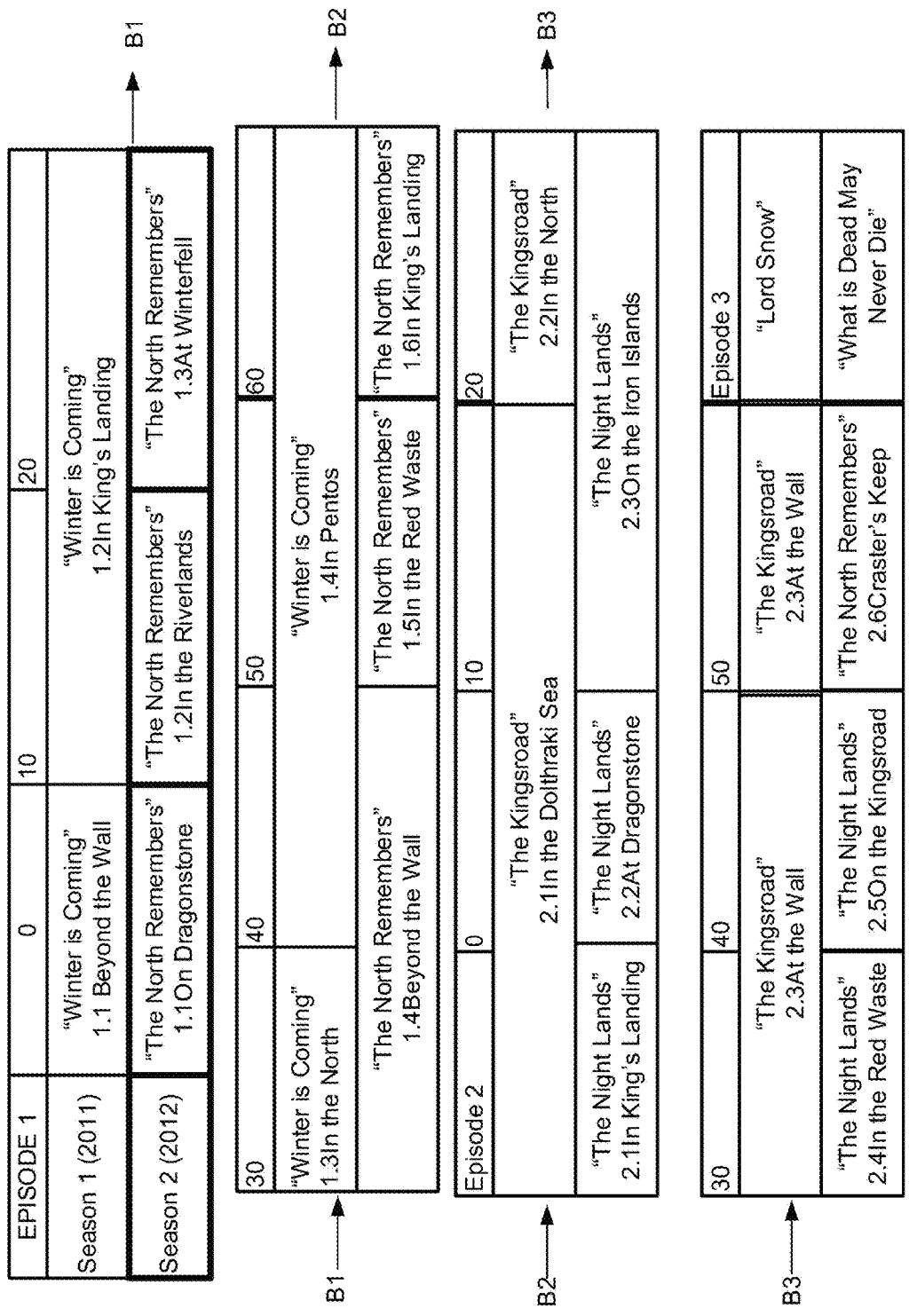
FIG. 13 shows an illustrative broken timeline of chronologically arranged segments of episodes of a program, in accordance with some embodiments of the present disclosure.

FIG. 13 shows illustrative broken timeline 1300 of chronologically arranged segments of episodes of a program, in accordance with some embodiments of the present disclosure. Breaks B1, B2, and B3 allow timeline 1300 to be displayed more conveniently. Accordingly, because a chronological timeline of all segments of all episodes may be cumbersome to display by the system, or consume by the user, the filtered displays of the present disclosure may be preferred in some circumstances. In some embodiments, a displayed grid allows more information to be arranged in a display, avoided the constraint of achieving a complete timeline of all segments. By parsing the segments by storyline, season, or other identifier, the information may be arranged in a more convenient form.

FIG. 14 shows illustrative display 1400 including a grid showing episode identifiers for a program, in accordance with some embodiments of the present disclosure. Display 1400 includes four rows, each corresponding to a character (e.g., Characters 1-4), and columns, each corresponding to a time indicator. Display 1400 is relatively sparse (e.g., less than 50% of the grid includes episode identifiers), thus wasting a fraction of display 1400 on blank or non-informative space. In some circumstances, a user might not find such a display useful or efficient.

FIG. 15 shows illustrative display 1500 including a grid showing episode identifiers for the program of FIG. 14, filtered by characters, in accordance with some embodiments of the present disclosure. For example, in display 1500, only episode identifiers corresponding to episodes featuring Characters 1 and 2 are displayed, improving density, thus allowing the bottom two rows of the grid to be used for showing additional information (e.g., information related to Characters 1 and 2).

FIG. 16 shows illustrative display 1600 including a grid showing episode identifiers for the program of FIG. 14, with a modified timeline, in accordance with some embodiments of the present disclosure. The modified timeline of display 1600 condenses the episode identifiers in each row to eliminate dead space in each row, thus increasing the density and providing the user more potentially relevant information. In some embodiments, each segment is displayed to have a length scaled to the duration of the segment (e.g., longer segments appear longer in the display). Although illustrated as integer multiples of 15 minutes, the duration of segments may be any suitable duration, which may be, but need not be, integer multiples or constants. A display may include any suitable timeline in accordance with the present disclosure.

In some embodiments, the system provides a display that is not constrained by the airing time (e.g., on-demand content can be consumed out of order). In some embodiments, the system allows one or more filters to be applied (e.g., successively or in parallel) to further reduce the amount of displayed information, thus collapsing the display into a more manageable grid. In some embodiments, for example, after filtering, a user may view a display that completely and exclusively includes the content they want to watch. For example, a user is able to watch a three-minute scene of interest in the context of related scenes, rather than linearly watching an hour of programming. Filtering may be performed by, for example, the user, a content owner, any other suitable entity, or any combination thereof. In some embodiments, the system includes one or more versions, options, display styles, or sets of display preferences based on a user's viewing preferences (e.g., a binge watcher, an occasional watcher, user-specified favorite storylines). For example, the system may apply different pricing for displaying content based on filtering as opposed to linear consumption of the program.

FIG. 17 shows illustrative display 1700 including a grid showing episode identifiers for a program, without filtering, in accordance with some embodiments of the present disclosure. Display 1700 includes a grid showing seasons 1-5 and episodes 1-7. In this illustrative example, the indicators "x" are used as episode identifiers to indicate that the episode is available for viewing. The user has selected season 2 episode 2 (S2EP2) for example, indicated by the highlight. Display 1700 may include a default display (e.g., un filtered or otherwise not arranged in any user-defined way), wherein the grid is arranged by season and episode.

FIG. 18 shows illustrative display 1800 generated by filtering in formation included in display 1700 of FIG. 17 by character and location, in accordance with some embodiments of the present disclosure. By selecting S2EP2, a nested grid of S2EP2 is displayed showing a grid of episodes including Characters 1, 2, and 3 at Locations 1, 2, and 3. The user-controlled cursor is highlighting a segment corresponding to Location 3 and Character 1 of S2EP2. Display 1800 includes fewer episodes and seasons than display 1700 as columns and rows are pushed out of the displayed grid, yet provides more detailed information for a subset of episodes (e.g., S2EP2).

FIG. 19 shows illustrative display 1900 generated by navigating display 1800 of FIG. 18 by character and location, in accordance with some embodiments of the present disclosure. By selecting S2EP3, a nested grid of S2EP2 and S2EP3 is displayed showing a grid of episodes including Characters 1, 2, 3, and 4 at Locations 1, 2, 3, 4, and 5. The user-controlled cursor is highlighting a segment corresponding to Location 2 and Character 1 of S2EP3. Display 1900 includes fewer episodes and seasons than display 1800, with more detailed information (e.g., segments including Characters 1-4 and Locations 1-5) for a subset of episodes (e.g., S2EP2 and S2EP3). By filtering, for example, the timeline (e.g., horizontal axis) is condensed from seven episodes in display 1700, to five episodes in display 1800, to three episodes in display 1900.

FIG. 20 shows illustrative display 2000 generated by navigating display 1900 of FIG. 19 by character and location, in accordance with some embodiments of the present disclosure. By selecting S2EP4, a nested grid of S2EP3 and S2EP4 is displayed showing a grid of episodes including Characters 1, 3, 4, and 5 at Locations 1, 2, 3, 4, and 5. The user-controlled cursor is highlighting a segment corresponding to Location 1 and Character 5 of S2EP4. Display 2000 includes fewer episodes and seasons than display 1800, with more detailed information (e.g., segments including Characters 1-4 and Locations 1-5) for a subset of episodes (e.g., S2EP2 and S2EP3). Accordingly, navigating through the display may allow expansion of some cells and alter the grid axis dynamically, thus keeping relevant data in focus (e.g., in view of the user).

FIG. 21 shows illustrative display 2100 generated by altering the filter of display 2000 of FIG. 20 by character and location, in accordance with some embodiments of the present disclosure. By deselecting filters, display 2100 includes more episodes than display 1900. For example, displaying 2100 includes freezing filters for Characters 1 and 4, while releasing filters for other Characters. Episodes not including Characters 1 and 4 are not included in the grid of display 2100.

FIG. 22 shows illustrative display 2200 generated by rearranging display 1700 of FIG. 17 by character and location, in accordance with some embodiments of the present disclosure. In some embodiments, as a user watches more episodes of a series, gains experience with the series controls provided by the system, or both, the user may direct the system to freeze a filter, alter one or more grid axes, or otherwise customize a display. With regards to display 2200, the user has set a filter for Character 1, and the displayed grid allows browsing of episodes by Location, with each cell of the grid displaying the chapter where Character 1 appears in specified location (e.g., with a timestamp in each cell). Not that the "x" displayed in some cells may include a time indicator (e.g., a timestamp, a start time, a duration, a stop time, or a combination thereof), segment information, any other suitable information, or any combination thereof.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for displaying storyline information of a program, the method comprising:
    causing to be displayed, using control circuitry, a plurality of storyline identifiers and a plurality of time period indicators, wherein each storyline identifier of the plurality of storyline identifiers corresponds to a respective storyline;
    causing to be displayed, using the control circuitry, a plurality of episode indicators, each aligned with a respective one of the plurality of storyline identifiers, wherein each episode indicator indicates an episode of the program that contains content related to the storyline identifier with which it is aligned;
    receiving an input selecting a storyline identifier from the plurality of storyline identifiers; and
    causing to be displayed updated time period indicators that reflect when, in at least one of the plurality of episode indicators, content related to the storyline corresponding to the selected storyline identifier occurs.

2. The method of claim 1, further comprising generating for display a grid comprising the plurality of storyline identifiers, the plurality of time period indicators, and the plurality of episode indicators.

3. The method of claim 1, wherein each time period indicator comprises at least one of a start time, an end time, and a duration of the content related to the storyline identifier with which it is aligned.

4. The method of claim 1, wherein each episode indicator comprises a season index and an episode index.

5. The method of claim 1, wherein each storyline corresponds to a plurality of episodes of the program.

6. The method of claim 1, further comprising repeating;
    receiving a user input selecting a new storyline identifier of the plurality of storyline identifiers; and
    causing to be displayed updated time period indicators that reflect when, in at least one of the plurality of episode indicators, content related to the new storyline corresponding to the selected new storyline identifier occurs.

7. The method of claim 1, further comprising:
    identifying metadata for the program;
    identifying each storyline corresponding to the plurality of storyline identifiers; and
    determining the plurality of time period indicators based at least in part on the metadata and at least in part on the plurality of storyline identifiers.

8. The method of claim 1, further comprising:
    identifying the program based on user input; and
    generating for display the plurality of storyline identifiers in response to the identifying the program, wherein the plurality of storyline identifiers each correspond to the program.

9. The method of claim 1, further comprising generating a visual transition corresponding to updating the display, wherein the visual transition comprises condensing the first timeline to create the second timeline.

10. The method of claim 1, wherein the input is received due to a user selecting the storyline identifier.

11. The method of claim 1, wherein the plurality of storyline identifiers each correspond to at least one of a plot arc, a character, and a location depicted in the program.

12. The method of claim 11, further comprising retrieving the plurality of storyline identifiers from a database based on the identifying of the program.

13. A method for displaying storyline information of a program, the method comprising:
 causing to be displayed, using control circuitry, a display on a first device, the display comprising a plurality of segment identifiers and a plurality of time period indicators, wherein the plurality of time period indicators span a first time period and each segment identifier is aligned with one or more time period indicators;
 receiving an input selecting a storyline filter corresponding to a storyline of the program extending across more than one episode of the program, wherein the selected storyline filter is aligned with at least one segment identifier; and
causing to be updated, using control circuitry, the display, by:
 removing at least one segment identifier of the plurality of segment identifiers that does not correspond to the selected storyline filter; and
 updating the plurality of time period indicators to span a second time period that is condensed relative to the first time period based on the selected storyline filter.

14. The method of claim 13, wherein the display comprises a grid comprising the plurality of segment identifiers.

15. The method of claim 13, wherein the updated display comprises a grid comprising the plurality of segment identifiers.

16. The method of claim 13, wherein each segment identifier comprises one of a time indicator, a chapter title, and an episode identifier.

17. The method of claim 13, wherein each storyline extends across more than one season of the program.

18. The method of claim 13, wherein removing at least one segment identifier of the plurality of segment identifiers that does not correspond to the selected storyline filter comprises:
 identifying metadata for each segment corresponding to a segment identifier of the plurality of segment identifiers;
 determining whether the metadata for each segment corresponds to the storyline filter; and
 excluding segment identifiers of the plurality of segment identifiers that correspond to segments having metadata that is determined not to correspond to the storyline filter.

19. The method of claim 13, wherein the storyline filter is a first storyline filter and the storyline is a first storyline, and wherein updating the display further comprises removing at least one segment identifier of the plurality of segment identifiers that does not correspond to a second storyline filter corresponding to a second storyline of the program.

* * * * *